United States Patent [19]

Nakatsu et al.

[11] Patent Number: 5,031,991
[45] Date of Patent: Jul. 16, 1991

[54] OPTICAL COUPLING CIRCUIT ELEMENT

[75] Inventors: Hiroshi Nakatsu; Toshiyuki Okumura, both of Tenri; Kazuhiko Inoguchi; Haruhisa Takiguchi, both of Nara, all of Japan

[73] Assignee: Sharp Kabushiki Kaisha, Osaka, Japan

[21] Appl. No.: 444,442

[22] Filed: Dec. 1, 1989

[30] Foreign Application Priority Data

Dec. 1, 1988 [JP] Japan .................. 63-305410

[51] Int. Cl.⁵ .............................. G02B 6/32
[52] U.S. Cl. ...................... 350/96.18; 350/452
[58] Field of Search .......... 350/452, 96.18, 445, 350/446, 96.17

[56] References Cited

U.S. PATENT DOCUMENTS 3,761,184 9/1973 McLaughlin .............. 350/452
4,671,625 6/1987 Noble ........................ 350/452
4,832,464 5/1989 Kato et al. ................. 350/3.72

FOREIGN PATENT DOCUMENTS 47-43670 11/1972 Japan .
63-77003 4/1988 Japan .

OTHER PUBLICATIONS

Nishihara et al., "Holocoupler: A Novel Coupler for Optic Circuits", in IEEE Journal of Quantum Electronics, Sep. 1975, pp. 794–796.

Primary Examiner—Akm Ullah
Assistant Examiner—Robert E. Wise

[57] ABSTRACT

An optical coupling circuit element providing one transparent substrate, a first micro Fresnel lens formed on one side surface of said substrate, and a second micro Fresnel lens formed on the other side surface of said substrate, so that coherent light incident into said first micro Fresnel lens is projected, through said transparent substrate, on said second micro Fresnel lens to be left therefrom as a collimating beams, which is useful for directing light emitted from coherent source such as semi-conductor laser to optical communication means such as optical fiber for condensation.

22 Claims, 6 Drawing Sheets (a)

(b)

(a)

(b)

(c)

FIG. 10 (a) (PRIOR ART)
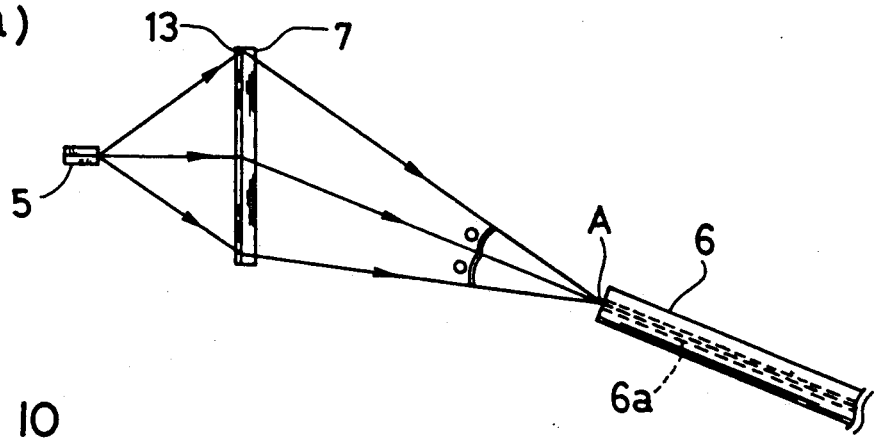
FIG. 10 (b)
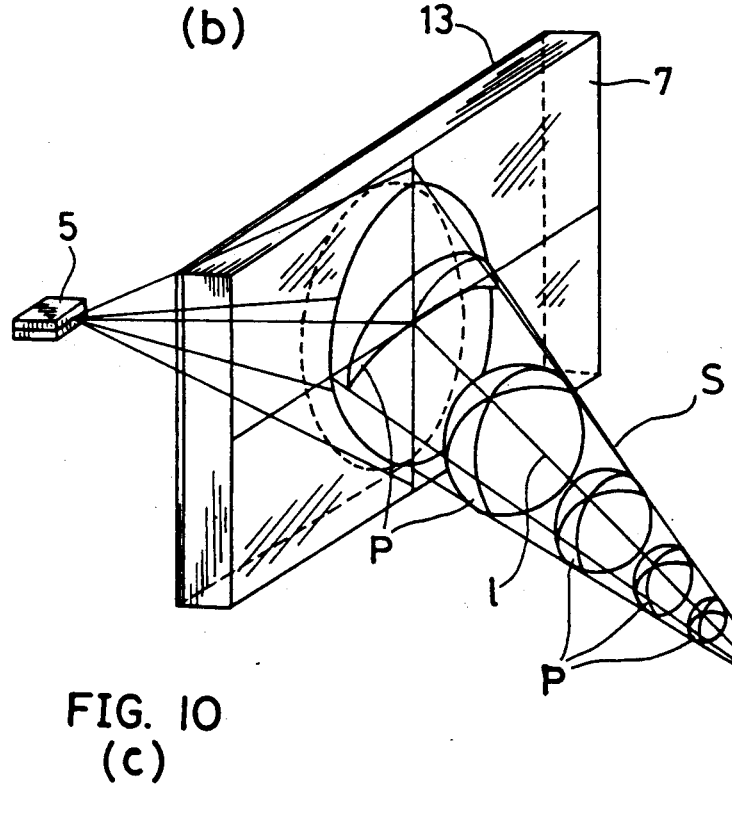
FIG. 10 (c)
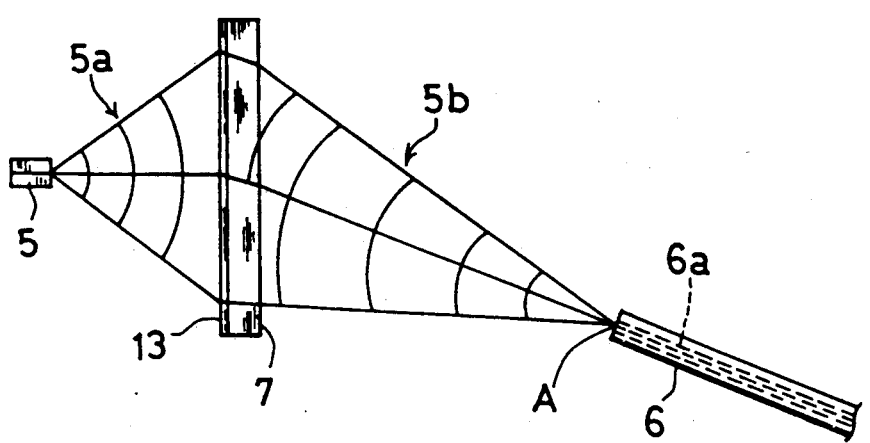

OPTICAL COUPLING CIRCUIT ELEMENT

BACKGROUND OF THE INVENTION

1. Field of the Invention

The invention relates to an optical coupling circuit element and more particularly to an optical circuit coupling element using a micro Fresnel lens for collimating light emitted from a coherent source such as a semiconductor laser to an optical communication means such as an optical fiber for condensation.

2. Description of the Prior Art

Optical fiber communication for a long distance and high capacity uses semiconductor lasers having higher coherency as a source. This is done since light emitted from the semiconductor laser is required to be effectively directed to optical communication means such as an optical fiber.

A far field pattern of light emitted from semiconductor laser is usually longer lengthwise and elliptic. Such light when collimated, by use of a customary axially symmetric optical lens, will be gathered elliptically, so that when the light is input to a core of an optical fiber whose aperture angle is in right circular conical shape, a poorer in coupling efficiency will occur in comparison with a circular collimation. To solve the problem, various constructions have been proposed previously.

The use of a micro Fresnel lens with a hologram on a transparent substrate for an optical circuit coupling element has been hitherto proposed (Japanese Patent Publication No. SHO 47-43670). The micro Fresnel lens realized reduction of spherical aberration that is difficult for the conventional lens to achieve, and lowering of ellipticity of elliptically emitted light from semiconductor laser used as a source. In recent years, a computer generated hologram has been used for the fabrication of micro Fresnel lens, wherein in a similar manner for production of IC, a hologram pattern is formed by exposure on a transparent substrate which is then diced similarly to an IC chip. The computer designed hologram can be formed by writing on an EB resist with an electron beam. By changing the dosage of the electron beam, a saw-tooth shaped diffraction grating can be achieved and a micro Fresnel lens having diffraction efficiency of almost 100% can be fabricated.

FIG. 10 shows a conventional example using a micro Fresnel lens to direct the light emitted from semiconductor laser to an optical fiber. A micro Fresnel lens 13 formed on a transparent substrate 7 can result in an outgoing of elliptic light (spherical wave) 5a from a semiconductor 5 in a manner of having a round shape on the section of an optical fiber 6. In detail, the light passing the micro Fresnel lens can be converted into a spherical wave 5b collimating circularly to a core 6a at the optical fiber 6. In other words, the spherical wave converges into a shape of cone S in which a right circular cone having as its top the center A of the core 6a of the optical fiber 6 is cut with the micro Fresnel lens [see FIG. 10(b)]. Thus, the micro Fresnel lens 13 is arranged in such a manner that the mother line m of the core 6a of optical fiber 6 is placed on an extension of a line 1 connecting a center of circle defined by the bottom of that right circular cone with a top thereof (the line 1 will be called hereunder "axis of right circular cone").

When using the micro Fresnel lens 13 shown in FIG. 10, the optical axis at the outgoing side, i.e., the axis of right circular cone does not correspond to the optical axis at the incidence, i.e., the axis of elliptic incident ray.

When such an off-axial type construction is used, the following problems will occur. First, since the arrangement is poor in symmetry, the optical axis is likely to be deflected due to thermal expansion of mount material, etc. Also, locations or angles in setting modules are hard to be decided. Furthermore, the optical system cannot be made compact as a whole.

To solve the abovesaid problems, two micro Fresnel lens may be used to enable an arrangement having a favorable symmetry, and such a coaxial type construction that the optical axis at the incidence side are coaxially disposed with the optical axis at the outgoing side, i.e., the axis of the right circular cone.

However, the coaxial construction with two micro Fresnel lens causes an additional problem. Generally, as an optical system increases the number of constituent optical elements, accuracy of the entire system will lower due to cumulation of specific positional deflections of the optical elements. That is, in the case of using two micro Fresnel lens, there is the problem of positional deflection between the two lens.

The present invention has been designed to overcome the abovesaid problems.

SUMMARY OF THE INVENTION

The present invention is aimed to provide an optical coupling circuit element which can be arranged with a favorable symmetry to enable an incident ray from a coherent source having an elliptic far field pattern to be converted into a spherical wave converging into a shape of cone forming a part of right circular cone, which is no positional changes between micro Fresnel lens constituting the optical coupling circuit element.

Thus, according to the invention, there is provided an optical circuit coupling element for collimating a radiation beam from a coherent source to direct it to optical communication means such as an optical fiber, comprising one transparent substrate, a first micro Fresnel lens formed on one side of the transparent substrate, and a second micro Fresnel lens formed on the other side of the transparent substrate, so that coherent light incident to the first micro Fresnel lens is projected to the second micro Fresnel lens through the transparent substrate to focus the light beam. In such a construction, an optical axis of the coherent light as a diverging spherical wave from the coherent source and an optical axis of collimated beam from the second micro Fresnel lens can be set on the same line, whereby the divergent spherical wave from the coherent source can be focused as a spherical wave converging in shapes of right circular cone or slanted circular cone so as to focus on a core of an optical fiber, thereby preventing the coupling efficiency of source and optical fiber from lowering. Also, since two micro Fresnel lens are formed on one transparent substrate, the positional deflection between the two lens can be eliminated.

In another aspect, the present invention provides an optical circuit coupling element which condenses the outgoing light from the coherent source to direct the light to optical communication means such as an optical fiber, comprising one transparent substrate, a first micro Fresnel lens formed on one side of the transparent substrate, a reflecting mirror formed on the other side of the transparent substrate, and a second micro Fresnel lens formed in parallel to the first micro Fresnel lens on that one side of the transparent substrate, so that the coherent light incident to the first micro Fresnel lens passes through the transparent substrate to be changed in direction by the reflecting mirror, and passes through the transparent substrate again to then be a focused beam from the second micro Fresnel lens. In such a construction, since two micro Fresnel lens are formed on the one side face of the transparent substrate, and the reflecting mirror is formed on the other side face, the projected light to pass the first micro Fresnel lens and to be changed in direction by the reflecting mirror is enabled to be condensed to the optical fiber in the shape of right circular cone, thereby preventing coupling efficiency of source and optical fiber from lowering. Also, since the two micro Fresnel lens are formed on the transparent substrate, the positional deflection between the lens can be eliminated.

BRIEF DESCRIPTION OF THE DRAWINGS

FIGS. 10 (a), 10 (b), 10 (c) are explanatory views for showing a conventional optical coupling circuit element.

DESCRIPTION OF PREFERRED EMBODIMENTS

Generally, a wave optical consideration will be required to effectively feed light into a single mode fiber. Also, for effectively coupling incident light to an optical fiber, the wave front of the incident light should correspond to a waveguide front of the optical fiber.

Figure 9:
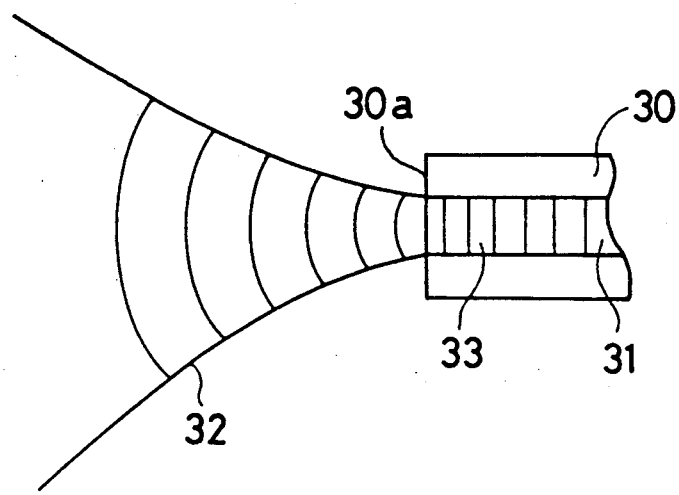
FIGS. 9 (a), 9 (b) and 9 (c) are explanatory views of function of an optical coupling circuit element of the invention.
Figure 9:
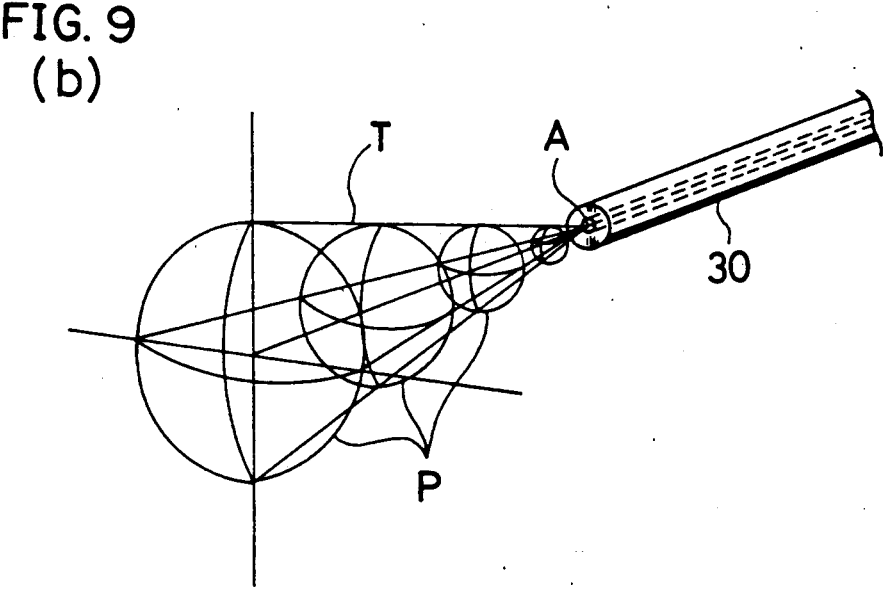
Figure 9:
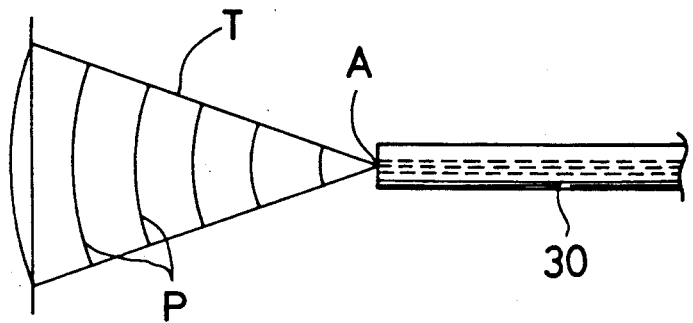

Referring to FIG. 9, a single mode fiber 30 is formed in axial symmetry, and a core 31 as a waveguide the front of the fiber 30 is naturally round. For effectively converging light to a round end face 30a of the fiber 30, it is enough that a waist of converging beam comes to the end face 30a and a shape of the beam shape is round. To form such a shape of beam, the wave front P of the beam is naturally a spherical wave 32, so that a plane wave 33 is transmitted to the inside of the core 31. As shown in FIG. 9 (b) and 9 (c), it is necessary to form a micro Fresnel lens in such a manner that light is to leave as a spherical wave converging to a top A of a right circular cone T.

Figure 1:
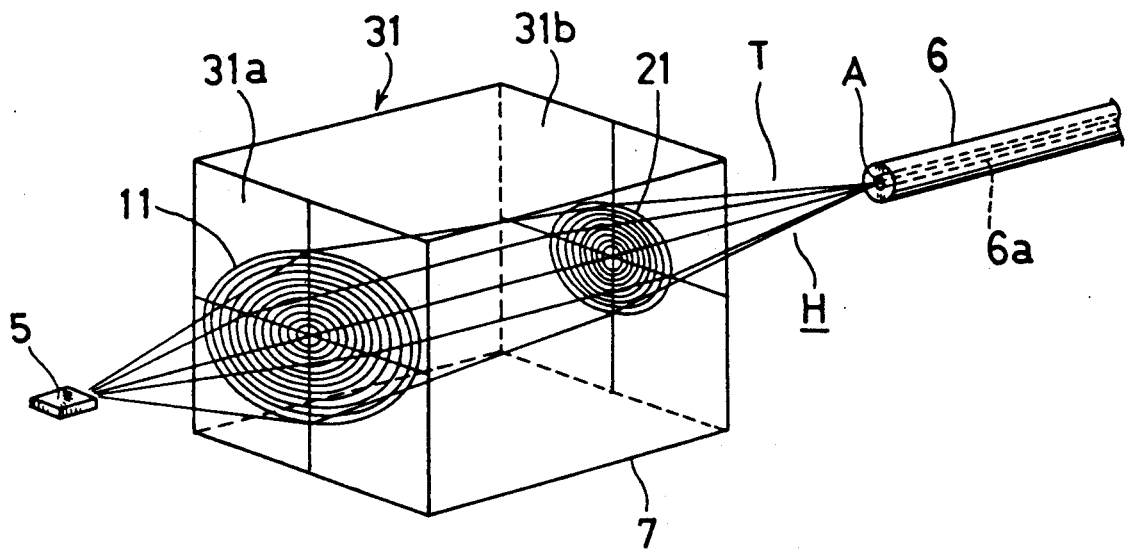
FIG. 1 is a perspective view of an optical coupling circuit element of one embodiment of the present invention, illustrating the state that laser beam is directed to an optical fiber.

In the present invention, as shown in FIG. 1, two micro Fresnel lenses 11, 21 are arranged on one transparent substrate 7, so that the micro Fresnel lens 21 at the fiber side convert to shape for formation of a spherical wave, i.e., to be a hologram of elliptic shape in the case of a coaxial system, while the micro Fresnel lens 11 at a semiconductor laser 5 side requires, in the case of coaxially system, to be able to convert an elliptic beam of the semiconductor laser 5 to a round beam for spherical wave.

A hologram having a magnitude covering the ellipse of beam, a thick pitch in the major axis direction of the ellipse, and a thin pitch in the minor axis direction of the ellipse can be preferably used as the micro Fresnel lens 11 (see FIG. 1).

In the present invention, an adjustment method for a coupled circuit comprising two holograms is as follows in brief.

1. First, to fix a stem mounting a chip of the semiconductor laser to decide the optical axis,
2. to set holograms perpendicularly to the optical axis, and simultaneously, to generally adjust an interval between the semiconductor laser and the hologram,
3. to set an end of an optical fiber on the optical fiber to generally adjust an interval between the hologram and the optical fiber,
4. to switch on the semiconductor laser, a monitor beam coming out of output of the optical fiber moves the holograms vertically and fixes them at a point where the output beam becomes maximum,
5. to move the output end of the optical fiber along the optical axis and fix the fiber at a point where the output beam becomes maximum.

The coherent source to be used in the invention may be a semiconductor laser.

The collimating light in the invention may be a spherical wave H having a shape of right circular cone T and converging its top with respect to a center of the core 6a of the optical fiber 6 (see FIGS. 1, 5, 6, or 9) and a spherical wave having a shape of a slanting circular cone J and converging accordingly. Reference A is a top of the cone J.

The first micro Fresnel lens of the invention may preferably has a thick pitch at a position corresponding to a major axis direction of an elliptic far field pattern of coherent light and a thin pitch at a position corresponding to a minor axis direction.

The second micro Fresnel lens of the invention may preferably be an elliptic shape.

The first and second micro Fresnel lens can be fabricated by a conventional technique, e.g., using a computer designed hologram. In the same way as for production of IC, a hologram pattern is formed by exposure on a transparent substrate and is put into dicing as the IC chip. The computer generated hologram can be formed by writing on an EB resist with electron beam. The change of dosage of electron beam may provide a saw-tooth shaped diffraction grating to provide a micro Fresnel lens having a diffraction efficiency of almost 100%.

FIG. 1 shows one embodiment of the optical coupling circuit element, showing the state that light from a semiconductor laser 5 is taken into an optical fiber 6 through the optical coupling circuit element. A divergent spherical wave issued from the semiconductor laser 5 goes into a micro Fresnel lens 11 formed on one face 31a of a transparent substrate 7 of a rectangle parallel-linked. The other side face 31b of the substrate 7 has a micro Fresnel lens 21. Since the far field pattern of outgoing light of semiconductor is elliptic usually, incident light is projected elliptically on the micro Fresnel lens 11 on which a hologram is formed to project circularly that incident light on the micro Fresnel lens 21 through the transparent substrate 7. Also, on the micro Fresnel lens 21 is provided a hologram which transmits the circularly projected light as a spherical wave converging to a top A of the right circular cone having a round bottom. A center of core 6a of an optical fiber 6 is located at the top A of the right circular cone, so that the converging spherical wave can be effectively taken into the optical fiber 6. In the case that the micro Fresnel lens 21 at the fiber side is perpendicular to an extended line of an axis of the core 6a in the present example, the micro Fresnel lens 11 at the semiconductor side requires to circularly transmit a circularly projected incident light on the micro Fresnel lens 21 at the fiber side.

Figure 2:
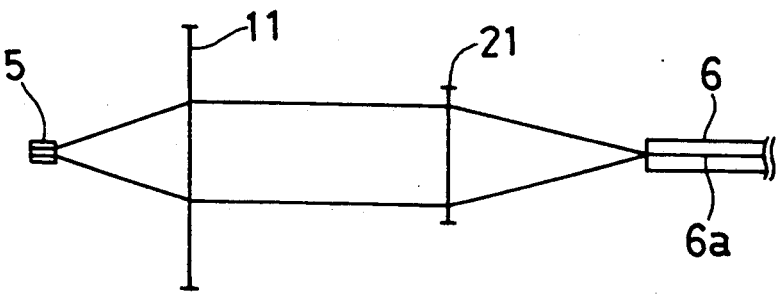
FIGS. 2 (a) and 2 (b) are explanatory views showing the state of converging of light on horizontal and vertical planes with respect to the optical coupling circuit element of FIG. 1.
Figure 2:
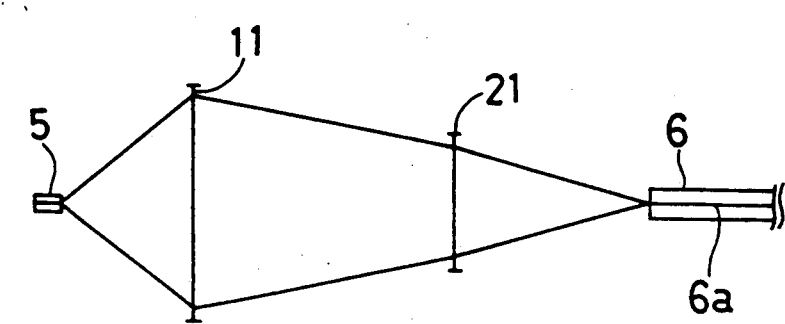

FIGS. 2 (a) and 2 (b) show the state on a parallel plane (called hereinafter horizontal plane) to a junction of the semiconductor laser in FIG. 1 and a plane perpendicular to the junction and having an optical axis (called hereinafter vertical plane). On the horizontal plane, width of light spread on the micro Fresnel lens 11 is equal to that on the lens 21, while on the vertical plane, width of widely spread light on the lens 11 is corrected to be equal to that on the horizontal plane.

Figure 3:
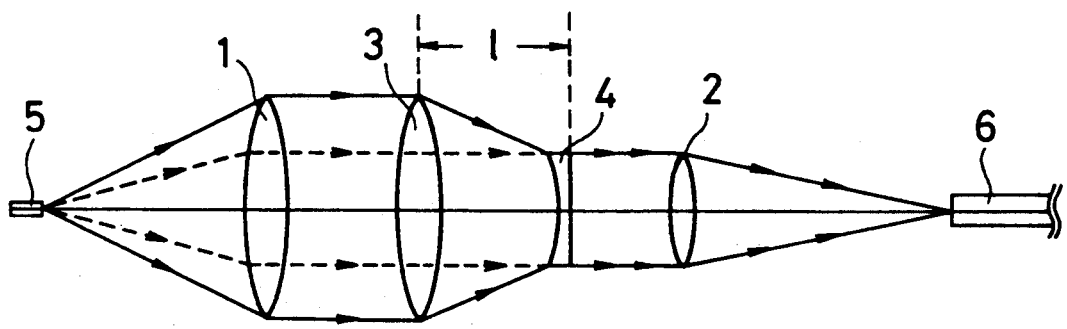
FIGS. 3 (a), 3 (b) and 3 (c) are explanatory explaining of optical elements providing operation of micro Fresnel lens, using three types optical lens.
Figure 3:
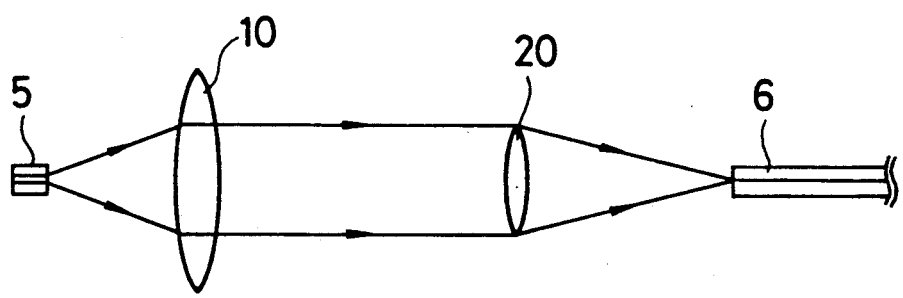
Figure 3:
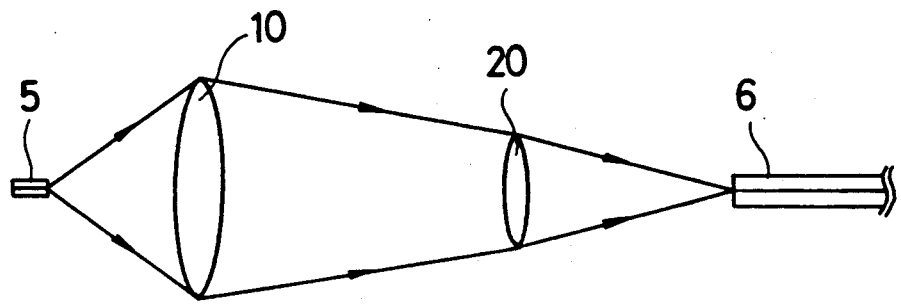

FIGS. 3 (b) and 3 (c) replace the micro Fresnel lens 11, 21 in FIGS. 2 (a) and 2 (b) with optical lens. FIG. 3 (a) further replaces the lens of FIGS. 3 (b) and 3 (c) with another two optical lens. In FIG. 3 (a), solid line shows the state on the vertical plane and dotted line shows that on the horizontal plane. Incident light is first changed to parallel rays by a collimating lens 1 that is a customary optical lens in axial symmetry. A lens 3 is a cylindrical lens, and functions as a convex lens only in a direction perpendicular to an interface of the semiconductor (called hereinafter vertical direction) but does not function in a direction parallel to the semiconductor interface and perpendicular to the optical axis (called hereinafter horizontal direction). Rays are contracted only in vertical direction and corrected to be circular at lens 4 spaced at an interval 1 from lens 3. The lens 4 is a cylindrical lens operating a concave lens only in vertical direction but not in the horizontal direction. Light corrected circularly by the lens 3 is changed by the lens 4 to be parallel rays keeping circularity and then reaches an objective lens 2. The objective lens is an optical lens in usual axial symmetry, so that the parallel rays changed to be circular are converted, with keeping the circularity, into a spherical wave collimating in a right circular cone shape so as to be collected to the core at the end face of the optical fiber 6.

Use of four lenses as in FIG. 3 (a) can correct the elliptic light to be circular. The number of lenses can be reduced. For instance, a first lens 10 shown in FIGS. 3 (b) and 3 (c) are composed of lens 1 and lens 3, and a second lens 20 of lens 2 and lens 4. As shown in FIG. 3 (b), on the horizontal plane, there is no function of two cylindrical lenses 3 and 4, and focal length $f_{1H}$ of first lens 10 in the horizontal direction is equal to that $f_1$ of the collecting lens 1.

$$f_{1H} = f_1 \quad (1)$$

Also, focal length $f_{2H}$ of second lens 20 in the horizontal direction is equal to that $f_2$ of the objective lens 2.

$$f_{2H} = f_2 \quad (2)$$

As shown in FIG. 3 (c), function of the two cylindrical lenses 3 and 4 appear on the vertical plane, so that focal length of first lens 10 in the vertical direction $f_{1V}$ is represented by the following formula when focal length of lens 3 in the vertical direction is $f_{3V}$.

$$\frac{1}{f_{1V}} = \frac{1}{f_1} + \frac{1}{f_{3V}} \quad (3)$$

And, length of first lens 20 in the vertical direction $f_{2V}$ is represented by the following formula when focal length of lens 4 in the vertical direction is $f_{4V}$.

$$\frac{1}{f_{2V}} = \frac{1}{f_2} + \frac{1}{f_{4V}} \quad (4)$$

Focal length $f_{3v}$ and $f_{4v}$ of the cylindrical lens can be obtained as follows. In an ellipse of far field pattern of the emitting light from semiconductor laser, when a ratio of major axis to minor axis is e, $$f_{3v} = -e f_{4v} \ (e > 1, f_{4v} < 0) \quad (5)$$

and an interval between lens 3 and 4 is $$l = f_{3v} + f_{4v} \quad (6)$$

From these relationship $$f_{3v} = \frac{el}{e-1}, f_{4v} = \frac{-1}{e-1} \quad (7)$$

Then, $f_{1v}$ and $f_{2v}$ can be obtained from the formula (3), (4) and (7).

Also, diameters in horizontal and vertical directions of holograms formed on the micro Fresnel lens 11, 21 can be obtained by inputting $f_{1v}$, $f_{2v}$, $f_{1H}$, $f_{2H}$ into f of the following formula.

$$\gamma_n = \sqrt{nf\lambda + n^2\lambda^2/4} \quad (8)$$

wherein n is degree of zones, and λ is wavelength of laser beam. The optical circuit coupling element 31 in FIG. 1 uses the micro Fresnel lens 11, 21 obtained by the abovesaid calculation.

Figure 4:
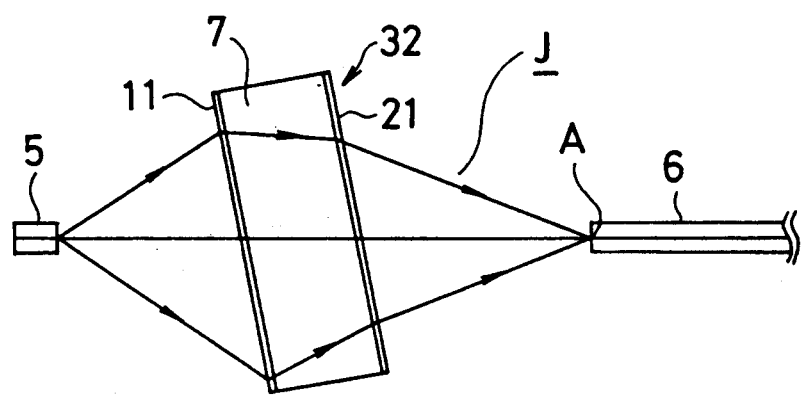
FIGS. 4, 5 and 6 are explanatory views showing constructions for the 2nd to 4th embodiments of the invention.
Figure 5:
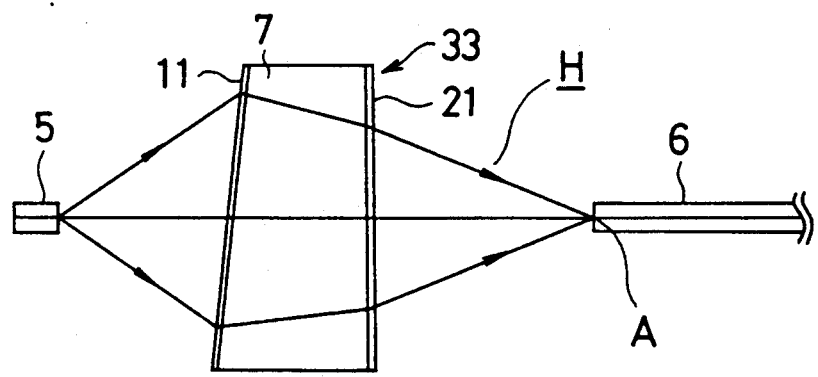
Figure 6:
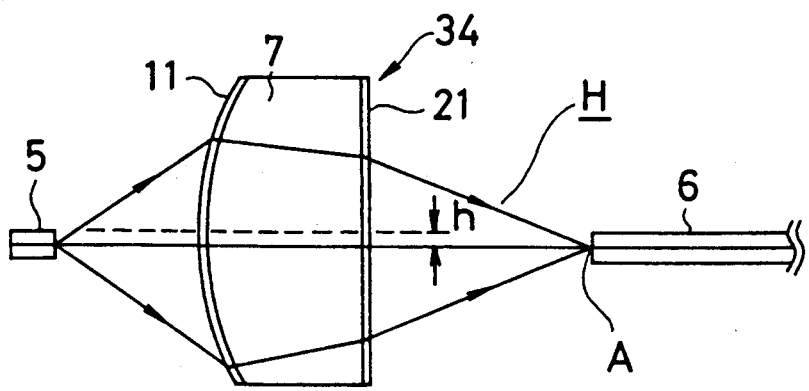

The embodiments shown in FIGS. 4-6 can prevent the generation of noises by restraining a part of light emitted from the semiconductor laser from returning thereto due to reflection by the micro Fresnel lens nearer the laser. In these cases, the micro Fresnel lenses 11, 21 with hologram are formed on the both side of the transparent substrate, and the face of the micro Fresnel lens nearer the semiconductor laser 5 in the optical coupling circuit element and wave normals extending at an intersection of the lens face with the optical axis of the emitting beam from laser are adapted not to correspond to an optical axis of outgoing light from the laser.

An optical coupling circuit element 32 in FIG. 4 provides micro Fresnel lenses 11, 21 on both surfaces of a transparent substrate, each surface being parallel.

FIG. 5 shows an example wherein one micro Fresnel lens 11 at an optical coupling circuit element 33 and nearer a semiconductor laser 5 is adapted to be slanted not perpendicular with respect to the optical axis of the laser beam.

An optical coupling circuit element 34 in FIG. 6 is made to be convex at its face nearer the semiconductor laser 5 and provides on the convex surface with the micro Fresnel lens 11, and an optical axis of the laser beam (indicated by solid line) is off-set by h from an axis of the convexed portion (by dotted line). Surfaces of the micro Fresnel lens 11 in the abovesaid coupling elements 32-34 are not perpendicular to the optical axis of the laser beam, so that the hologram for the micro Fresnel lens 21 nearer the optical fiber 6 at each of the coupling elements is formed in a manner of capable of correcting the slanting of light passing through the lens 11.

Figure 8:
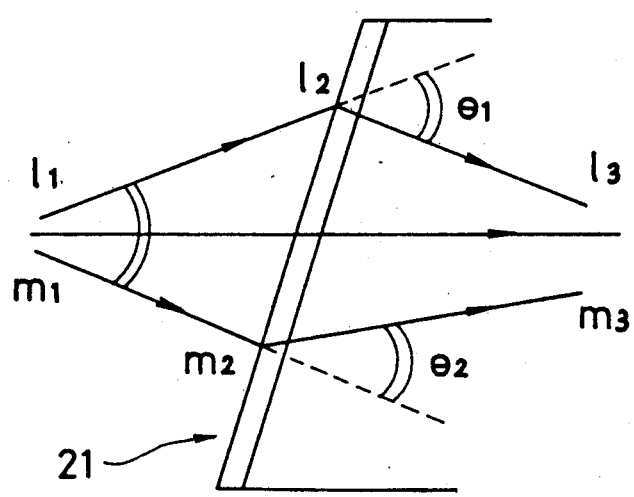
FIG. 8 is an explanatory view of correcting the slanting of light with respect to the 2nd to 4th embodiments.

The construction shown in FIG. 8 can change pitches of the diffraction grating of the hologram corresponding a direction of laser beam to a diffract beam at any desirable angles. To change light $1_1$, $1_2$ by angle $\theta_1$, pitch $d_1$ is set as $$d_1 \sin\theta_1 = \lambda$$

$$[d_1 \sin\theta_1 = n\lambda (n = \pm 1, \pm 2, \ldots)]$$

and to change light $m_1$, $m_2$ by angle $\theta_2$, pitch $d_2$ is set as $$d_2 \sin\theta_2 = \lambda$$

$$[d_2 \sin\theta_2 = n\lambda \ (n = \pm 1, \pm 2, \ldots)]$$

By gradually changing the pitches in the surface of hologram accordingly, slanting of the surfaces can be corrected.

The optical coupling circuit elements 33 and 34 in FIGS. 5 and 6 have the surfaces at the fiber side perpendicular to an optical axis, so that the laser beam emitted elliptically is projected circularly on the micro Fresnel lens 21 at the fiber side through the micro Fresnel lens 11 at the laser side, whereby enabling the outgoing light to be a spherical wave converging in a right circular cone shape.

In the coupling element 32 of FIG. 4, an existing surface at the micro Fresnel lens 21 at the optical fiber side is not perpendicular to an optical axis of the outgoing light, so that in order to make the outgoing light to be spherical wave converging in a slanted circular cone shape, micro Fresnel lens 11 projects incident light on the micro Fresnel lens 21 in such a shape of cross section that the right circular cone is transected by the surface of the micro Fresnel lens 21.

Figure 7:
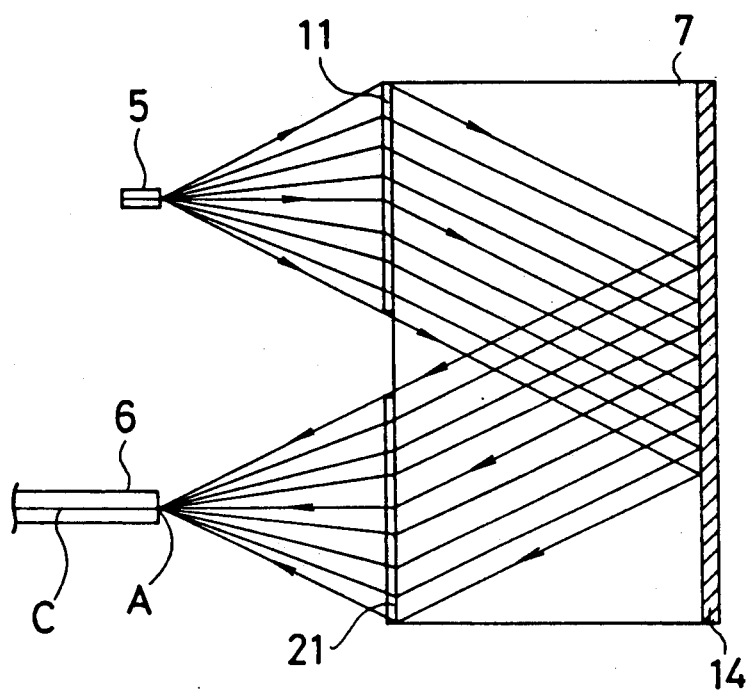
FIG. 7 is an explanatory view showing construction of an optical coupling circuit element of the 5th embodiment of the invention, illustrating the state that laser beam is directed to optical fiber.

FIG. 7 shows an embodiment wherein two micro Fresnel lenses 11, 21 are disposed on the same surface of a transparent substrate 7. The other side opposite to that surface thereof is formed a reflective mirror 14. The laser beam elliptically outgoing from a semiconductor laser 5 is directed to the reflective mirror 14 by the micro Fresnel lens 11 and reflected by the mirror 14 so as to be projected on the micro Fresnel lens 21. In this instance, the light is projected circularly on the lens 21 as a spherical wave converging in a right circular cone shape having the circularity as its bottom, and then focused on a top A of the right circular cone corresponding to the center C of core portion of optical fiber 6.

By using the optical coupling circuit element as disclosed in the embodiment, the semiconductor laser 5 and the optical fiber 6 can be mounted integrally to enable to constitute a compact module.

What is claimed is:

1. An optical coupling circuit element for collimating an emitting beam from a coherent source to direct the light to an optical communication means, comprising:
   one transparent substrate;
   a first micro Fresnel lens formed on one side surface of said substrate; and
   a second micro Fresnel lens formed on the other side surface of said substrate, so that coherent light that is directed into said first micro Fresnel lens is projected through said transparent substrate on said micro Fresnel lens to exit therefrom as a collimating beam.

2. An optical coupling circuit element of claim 1 wherein said coherent source is a semiconductor laser.

3. An optical coupling circuit element of claim 1 wherein said coherent source is a diverging spherical wave.

4. An optical coupling circuit element of claim 1 wherein said collimating beam is a spherical wave converging in a right circular cone shape.

5. An optical coupling circuit element of claim 1 wherein said first and second micro Fresnel lens have horizontal and flat lens surfaces and are arranged in parallel to each other, and an optical axis of said coherent light incident to said first micro Fresnel lens in parallel to an axis perpendicular to the lens surfaces thereof, an optical axis of a projecting light projected from said first micro Fresnel lens onto said second micro Fresnel lens through said transparent substrate and an optical axis of collimating beam leaving said second micro Fresnel lens are each arranged on the same line.

6. An optical coupling circuit element of claim 5 wherein said first micro Fresnel lens is a hologram element which can project a far field pattern in a substantial circular shape on said second micro Fresnel lens when pitches of lens circles of said first Fresnel lens are made thin on a central axis perpendicular to one central axis of a surface subjected to said coherent light incident into said second micro Fresnel lens in comparison with on the latter axis, and a major axis of an elliptic far field pattern of coherent light incident into said second micro Fresnel lens is adapted to correspond to said one central axis.

7. An optical coupling circuit element of claim 5 wherein said second micro Fresnel lens is a hologram element which is an elliptic shape and causes a circular light projected from said first Fresnel lens to converge as a spherical wave to a top of a right circular cone shape having said circular light as its bottom.

8. An optical coupling circuit element of claims 1 or 5 wherein said collimating beam is in a slanted circular cone shape and is a spherical wave converging from the bottom of said slanted circular cone to its top.

9. An optical coupling circuit element of claim 1 wherein said first and second micro Fresnel lens have horizontal and flat lens surfaces at both sides and are arranged in non-parallel to each other; and an optical axis of coherent light incident to said first micro Fresnel lens slantwise to an axis perpendicular to the lens surfaces thereof, an optical axis of a light projected from said first micro Fresnel lens onto said second micro Fresnel lens through said transparent substrate and an optical axis of a collimating beam leaving said second micro Fresnel lens are each arranged on the same line.

10. An optical coupling circuit element of claim 1 wherein said first micro Fresnel lens has lens surface which is convex having a central axis at a position displaced at a fixed interval from an optical axis of coherent light in a perpendicular direction thereto, and said second micro Fresnel lens has lens horizontal and flat surface, and an optical axis of coherent light incident to said first micro Fresnel lens slantwise to an axis perpendicular to the lens surfaces thereof, an optical axis of a light projected from said first micro Fresnel lens onto said second micro Fresnel lens through said transparent substrate and an optical axis of a converging bundle of rays leaving said second micro Fresnel lens are each arranged on the same line.

11. An optical coupling circuit element for collecting an outgoing light from a coherent source to direct the light to an optical communication means, comprising one transparent substrate, a first micro Fresnel lens formed on one side surface of said substrate, a reflective mirror formed on the other side surface of said substrate and a second micro Fresnel lens formed in parallel to said first micro Fresnel lens on said one side of said substrate, so that a coherent light incident into said first micro Fresnel lens is projected through said transparent substrate to said reflective mirror, changed in direction by said mirror, and passes through said substrate again to reach said second micro Fresnel lens so as to be left therefrom as a collimating beam.

12. An optical coupling circuit element of claim 11 wherein said coherent source is a semiconductor laser.

13. An optical coupling circuit element set forth in claim 11 wherein said coherent source is a diverging spherical wave.

14. An optical coupling circuit element set forth in claim 11 wherein said collimating beam is a spherical wave converging in a right circular cone shape.

15. An optical coupling circuit element set forth in claim 11 wherein said first micro Fresnel lens has a lens surface perpendicular to an optical axis of said coherent light and said second micro Fresnel lens has a lens surface perpendicular to an optical axis of said collimating beam.

16. An optical coupling circuit element set forth in claim 15 wherein said second micro Fresnel lens is a hologram element which is in an elliptic shape and causes a circular light projected from said first Fresnel lens and reflected by said reflective mirror to converge as a spherical wave to a top of a right circular cone shape spherical wave to a top of a right circular cone shape having said circular light as its bottom.

17. An optical coupling circuit element of claim 11 wherein said first micro Fresnel lens is a hologram element which can project a far field pattern in a substantially circular shape on said second Fresnel lens when pitches of lens circles of said first Fresnel lens are made thin on a central axis perpendicular to one central axis of a surface subjected to coherent incident light in comparison with one the latter axis, and a major axis of an elliptic far field pattern of incident coherent light is adapted to correspond to said one central axis, and said elliptic far field pattern is to be reflected by said reflective mirror.

18. An optical coupling circuit element for collimating a light beam emitted from a light source in order to direct the light to an optical communication apparatus comprising:
    a single transparent substrate having a first and second side surface;
    a first Fresnel lens formed on a first side surface of said substrate; and
    a second Fresnel lens formed on a second side surface of said substrate.

19. An optical coupling circuit element for collecting light from a light source in order to direct the light to an optical communication device comprising:
    a single transparent substrate having a first and second substrate side surface;
    a first and second Fresnel lens formed on the first substrate side surface; and
    a reflective mirror formed on the second substrate side surface.

20. The method of focusing a light beam emitted from a light source to an optical communication device comprising the steps of:
    (a) emitting light from the light source;
    (b) directing the light to an optical element that is transparent and has two side surfaces, each of the side surfaces containing a Fresnel lens;
    (c) passing the light through a first Fresnel lens;
    (d) passing the light through the substrate; and
    (e) passing the light through a second Fresnel lens so that the light will come in contact with the optical communication device.

21. The method of passing and focusing light from a light source to an optical device comprising the steps of:
    (a) providing a transparent substrate having two side surfaces, a first side surface containing two Fresnel lenses, the second side surface containing a mirror;
    (b) emitting light from said light source so that it passes through a first Fresnel lens and the transparent substrate;
    (c) reflecting the light from step (b) from the mirror;
    (d) passing the light through a second Fresnel lens; and
    (e) that the light can come in contact with an optical communication device.

22. An optical coupling circuit element for directing light from a coherent source to an optical communication means, comprising:
    a transparent substrate having a first and second side surface;
    a first micro Fresnel lens formed on a first side surface of said substrate;
    a reflective mirror formed on the second side surface of said substrate; and
    a second micro Fresnel lens formed in parallel to said first micro Fresnel lens on said first side of said substrate, so that coherent light that is directed into said first micro Fresnel lens is projected through said transparent substrate to said reflective mirror where the light is reflected and passes through said substrate again to reach said second micro Fresnel lens so as to exist therefrom as a collimating beam.

* * * * *